(12) United States Patent
Tsuboi et al.

(10) Patent No.: US 12,371,015 B2
(45) Date of Patent: Jul. 29, 2025

(54) VEHICLE CONTROL APPARATUS

(71) Applicant: Honda Motor Co., Ltd., Tokyo (JP)

(72) Inventors: Yuki Tsuboi, Wako (JP); Yuki Kizumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 18/124,521

(22) Filed: Mar. 21, 2023

(65) Prior Publication Data

US 2023/0311870 A1 Oct. 5, 2023

(30) Foreign Application Priority Data

Mar. 31, 2022 (JP) ................. 2022-058350

(51) Int. Cl.
*B60W 30/12* (2020.01)
*B60W 50/06* (2006.01)
*B60W 60/00* (2020.01)

(52) U.S. Cl.
CPC ............ *B60W 30/12* (2013.01); *B60W 50/06* (2013.01); *B60W 60/005* (2020.02); *B60W 2552/53* (2020.02); *B60W 2554/4041* (2020.02)

(58) Field of Classification Search
CPC .... B60W 30/12; B60W 60/005; B60W 50/06; B60W 2554/4041; B60W 2552/53
See application file for complete search history.

(56) References Cited

U.S. PATENT DOCUMENTS

| 9,227,632 | B1* | 1/2016 | Lee | B60W 30/0956 |
| 2019/0071094 | A1* | 3/2019 | Nishiguchi | B60W 30/18163 |
| 2019/0241184 | A1* | 8/2019 | Hayashi | G08G 1/167 |
| 2021/0276548 | A1* | 9/2021 | Cai | B60W 50/0098 |
| 2022/0063615 | A1 | 3/2022 | Tamura | |
| 2024/0083426 | A1* | 3/2024 | Okamoto | G08G 1/09 |
| 2024/0317275 | A1* | 9/2024 | Sugimoto | G06V 20/588 |

FOREIGN PATENT DOCUMENTS

| JP | 6189815 B2 | 8/2017 |
| JP | 2022039469 A | 3/2022 |

OTHER PUBLICATIONS

Japanese office action; Application 2022-058350; Nov. 14, 2023.

* cited by examiner

*Primary Examiner* — Naeem Taslim Alam
(74) *Attorney, Agent, or Firm* — Duft & Bornsen, PC

(57) ABSTRACT

A vehicle control apparatus for controlling a subject vehicle includes: an exterior environment detection unit configured to an external situation in a predetermined area around the subject vehicle while the subject vehicle traveling; and a microprocessor. The microprocessor is configured to perform: recognizing a pair of right and left division lines that define the lane in which the subject vehicle is traveling based on a detection value from the exterior environment detection unit; calculating a direction vector of the pair of right and left division lines recognized in the recognizing; calculating a movement vector of a forward vehicle ahead of the subject vehicle based on the detection value from the exterior environment detection unit; and determining the self-driving capability or the driving support capability to be applied to the subject vehicle based on the direction vector and the movement vector calculated in the calculating.

11 Claims, 8 Drawing Sheets

VEHICLE CONTROL APPARATUS

CROSS-REFERENCE TO RELATED APPLICATION

This application is based upon and claims the benefit of priority from Japanese Patent Application No. 2022-058350 filed on Mar. 31, 2022, the content of which is incorporated herein by reference.

BACKGROUND OF THE INVENTION

Field of the Invention

This invention relates to a vehicle control apparatus configured to control traveling of a vehicle.

Description of the Related Art

As this type of device, there has been conventionally known a device that recognizes a traveling division line that divides a lane on which a subject vehicle is traveling, based on a captured image of a traveling lane ahead of the subject vehicle (see, for example, Japanese Patent No. 6189815). In the device described in Japanese Patent No. 6189815, the reliability of the recognized traveling division line is calculated based on the attributes of the road on which the subject vehicle is traveling and the environmental conditions around the subject vehicle such as backlight, nighttime, and rainfall, and the possibility of erroneous recognition of the division line is determined based on the reliability.

Calculating the reliability of the division line and determining the possibility of erroneous recognition of the division line based on the reliability as in the device described in Japanese Patent No. 6189815 may take time to detect the erroneous recognition of the division line and may make it difficult to provide quick traveling support.

SUMMARY OF THE INVENTION

An aspect of the present invention is a vehicle control apparatus for controlling a subject vehicle having a self-driving capability or a driving support capability and traveling along a lane. The vehicle control apparatus includes: an exterior environment detection unit configured to an external situation in a predetermined area around the subject vehicle while the subject vehicle traveling; a microprocessor and a memory coupled to the microprocessor. The microprocessor is configured to perform: recognizing a pair of right and left division lines that define the lane in which the subject vehicle is traveling based on a detection value from the exterior environment detection unit; calculating a direction vector of the pair of right and left division lines recognized in the recognizing; calculating a movement vector of a forward vehicle ahead of the subject vehicle based on the detection value from the exterior environment detection unit; and determining the self-driving capability or the driving support capability to be applied to the subject vehicle based on the direction vector and the movement vector calculated in the calculating.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 8. A vehicle control system according to an embodiment of the present invention includes a vehicle control device.

The vehicle control system can be applied to both a vehicle having a self-driving capability, that is, a self-driving vehicle, and a vehicle not having a self-driving capability, that is, a manual driving vehicle. The self-driving vehicle has not only a self-driving capability but also a manual driving capability, and can be configured as a manual driving vehicle. The vehicle control device is configured to recognize a division line ahead of the subject vehicle traveling in the self-drive mode, and determine a level of the self-drive mode (hereinafter, referred to as self-driving level) to be applied to the subject vehicle based on the recognition results.

The vehicle control system according to the present embodiment can also be applied to a vehicle having a driving support capability. Hereinafter, a vehicle having a driving support capability will also be referred to as self-driving vehicle. In addition, a vehicle to which the vehicle control system according to the present embodiment is applied may be referred to as a subject vehicle to be distinguished from other vehicles. Hereinafter, it is assumed that the subject vehicle is a self-driving vehicle. The self-driving vehicle has not only a self-driving capability but also a manual driving capability, and can be configured as a manual driving vehicle. The subject vehicle (self-driving vehicle) can travel not only in a self-drive mode in which a driving operation by a driver is unnecessary, but also in a manual drive mode in which the driving operation is performed by the driver.

Figure 1:
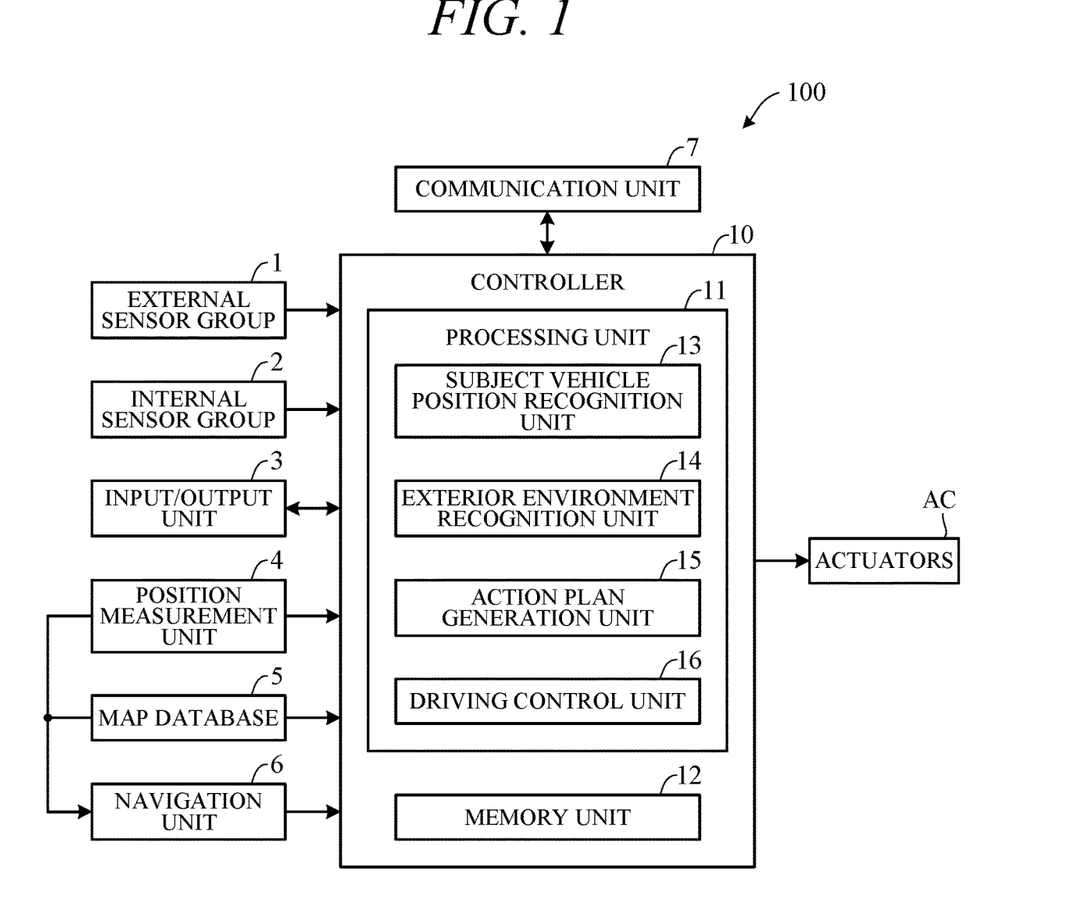
FIG. 1 is a block diagram schematically illustrating an overall configuration of a vehicle control system according to an embodiment of the present invention.

The subject vehicle may be any of an engine vehicle having an internal combustion engine (engine) as a traveling drive source, an electric vehicle having a traveling motor as a traveling drive source, and a hybrid vehicle having an engine and a traveling motor as traveling drive sources. FIG. 1 is a block diagram schematically illustrating an overall configuration of a vehicle control system 100 according to an embodiment of the present invention.

As illustrated in FIG. 1, the vehicle control system 100 mainly includes a controller 10, and an external sensor group 1, an internal sensor group 2, an input/output device 3, a position measurement unit 4, a map database 5, a navigation unit 6, a communication unit 7, and traveling actuators AC, which are each communicably connected to the controller 10 via CAN communication lines or the like.

The external sensor group 1 is a generic term for a plurality of sensors (external sensors) that detect an external situation which is peripheral information of the subject vehicle. For example, the external sensor group 1 includes a LiDAR that detects the position of an object around the subject vehicle (distance or direction from the subject vehicle) by irradiating the object with laser light and detecting reflected light, a radar that detects the position of an object around the subject vehicle by irradiating the object with electromagnetic waves and detecting reflected waves, and a camera that has an imaging element such as a CCD or a CMOS and captures an image around (front, rear, and side of) the subject vehicle.

The internal sensor group 2 is a generic term for a plurality of sensors (internal sensors) that detect a traveling state of the subject vehicle. For example, the internal sensor group 2 includes a vehicle speed sensor that detects the vehicle speed of the subject vehicle, an acceleration sensor that detects the acceleration in the front-rear direction and the left-right direction of the subject vehicle, a rotation speed sensor that detects the rotation speed of the traveling drive source, and the like. The internal sensor group 2 further includes sensors that detect driver's driving operations in the manual drive mode, for example, operation of the accelerator pedal, operation of the brake pedal, operation of the steering wheel, and the like.

The input/output device 3 is a generic term for devices in which a command is input from the driver or from which information is output to the driver. For example, the input/output device 3 includes various switches with which the driver inputs various commands by operating an operation member, a microphone with which the driver inputs a command by voice, a display that provides information to the driver via a display image, and a speaker that provides information to the driver by voice.

The position measurement unit (global navigation satellite system (GNSS) unit) 4 includes a positioning sensor that receives a signal for positioning, transmitted from a positioning satellite. The positioning sensor can also be included in the internal sensor group 2. The positioning satellite is an artificial satellite such as a global positioning system (GPS) satellite or a quasi-zenith satellite. The position measurement unit 4 uses positioning information received by the positioning sensor to measure the current position (latitude, longitude, and altitude) of the subject vehicle.

The map database 5 is a device that stores general map information used for the navigation unit 6, and is constituted of a hard disk or a semiconductor element, for example. The map information includes road position information, information of a road shape (curvature or the like), and position information of an intersection and a branch point. The map information stored in the map database 5 is different from highly accurate map information stored in a memory unit 12 of the controller 10.

The navigation unit 6 is a device that searches for a target route on roads to the destination input by the driver and provides guidance along the target route. The input of the destination and the provision of guidance along the target route are performed via the input/output device 3. The target route is calculated based on the current position of the subject vehicle measured by the position measurement unit 4 and the map information stored in the map database 5. The current position of the subject vehicle can also be measured using the detection values from the external sensor group 1, and the target route may be calculated on the basis of the current position and the highly accurate map information stored in the memory unit 12.

The communication unit 7 communicates with various servers not illustrated via a network including wireless communication networks represented by the Internet and a mobile telephone network, and acquires the map information, traveling history information, traffic information, and the like from the servers periodically or at an arbitrary timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated. It is also possible to communicate with other vehicles via the communication unit 7.

The actuators AC are traveling actuator for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the traveling motor is included in the actuators AC. The actuators AC also include a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, FIG. 1 illustrates the controller 10 as a set of these ECUs for convenience.

The memory unit 12 stores highly accurate road map information. The road map information includes road position information, information of a road shape (curvature or the like), information of a road gradient, position information of an intersection and a branch point, information of the number of lanes, width of a lane and position information for each lane (information of a center position of a lane or a boundary line of a lane position), position information of a landmark (traffic lights, signs, buildings, etc.) as a mark on a map, and information of a road surface profile such as unevenness of a road surface. The map information stored in the memory unit 12 includes map information acquired from the outside of the subject vehicle via the communication unit 7 and map information created by the subject vehicle itself using detection values from the external sensor group 1 or detection values from the external sensor group 1 and the internal sensor group 2.

The processing unit 11 includes, as functional components, a subject vehicle position recognition unit 13, an exterior environment recognition unit 14, an action plan generation unit 15, and a driving control unit 16.

The subject vehicle position recognition unit 13 recognizes the position of the subject vehicle (subject vehicle position) on the map, on the basis of the position information of the subject vehicle obtained by the position measurement unit 4 and the map information in the map database 5. The subject vehicle position may be recognized using the map information stored in the memory unit 12 and the peripheral information of the subject vehicle detected by the external sensor group 1, whereby the subject vehicle position can be recognized with high accuracy. When the subject vehicle position can be measured by sensors installed on a road or outside a road side, the subject vehicle position can be recognized through communication with the sensors via the communication unit 7.

The exterior environment recognition unit 14 recognizes an external situation around the subject vehicle, based on the signals from the external sensor group 1 such as a LiDAR, a radar, and a camera. For example, the exterior environment recognition unit 14 recognizes the position, speed, and acceleration of surrounding vehicles (forward vehicles and rearward vehicles) traveling around the subject vehicle, the positions of surrounding vehicles stopped or parked around the subject vehicle, the positions and states of other objects and the like. Other objects include signs, traffic lights, markings such as division lines and stop lines on roads, buildings, guardrails, utility poles, signboards, pedestrians, bicycles, and the like. The states of other objects include the color of traffic lights (red, green, and yellow), and the moving speeds and directions of pedestrians or bicycles.

The action plan generation unit 15 generates a driving path (target path) of the subject vehicle from the current point of time to a predetermined time ahead based on the target route calculated by the navigation unit 6, the map information stored in the memory unit 12, the subject vehicle position recognized by the subject vehicle position recognition unit 13, and the external situation recognized by the exterior environment recognition unit 14, for example. When there are a plurality of paths that are candidates for the target path on the target route, the action plan generation unit 15 selects, from among the plurality of paths, an optimal path that satisfies criteria such as compliance with laws and regulations, and efficient and safe traveling, and sets the selected path as the target path. Then, the action plan generation unit 15 generates an action plan corresponding to the generated target path. The action plan generation unit 15 generates various action plans corresponding to traveling modes, such as overtaking traveling for overtaking a preceding vehicle, lane change traveling for changing the traveling lane, following traveling for following a preceding vehicle, lane keeping traveling for keeping the lane, deceleration traveling, or acceleration traveling. At the generation of the target path, the action plan generation unit 15 first determines a travel mode, and then generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration per unit time calculated by the action plan generation unit 15 in consideration of travel resistance determined by a road gradient or the like in the self-drive mode. Then, the actuators AC are feedback controlled so that the actual acceleration detected by the internal sensor group 2 becomes the target acceleration, for example. More specifically, the actuators AC are controlled so that the subject vehicle travels at the target vehicle speed and the target acceleration. In the manual drive mode, the driving control unit 16 controls each of the actuators AC in accordance with a travel command (steering operation or the like) from the driver, acquired by the internal sensor group 2.

While the subject vehicle is traveling in the manual drive mode, the vehicle control system 100 configured as described above recognizes boundary lines (hereinafter, referred to as lane boundary lines) that define the lane of a road on which the subject vehicle is traveling, based on sensor values acquired by the external sensor group 1, generates road map information including the lane boundary lines, and stores the generated road map information in the memory unit 12. While the subject vehicle is traveling in the self-drive mode, the vehicle control system 100 recognizes lane boundary lines on the right side and left side of the subject vehicle based on the road map information stored in the memory unit 12, and controls the actuators AC so as to travel between the right and left lane boundary lines.

As one of the self-driving capabilities of the self-driving vehicle, there is a capability of controlling a traveling actuator so that the subject vehicle travels in a lane-keeping manner (hereinafter, referred to as lane-keeping capability). When the lane-keeping capability is enabled, the self-driving vehicle recognizes a pair of right and left division lines that define the current lane on the basis of image data (hereinafter, referred to as captured image data or simply captured image) obtained by a camera installed in a predetermined part of the vehicle (for example, the upper part of the windshield), and controls the traveling actuator so that the subject vehicle travels on the center line between the recognized pair of right and left division lines.

Figure 2A:
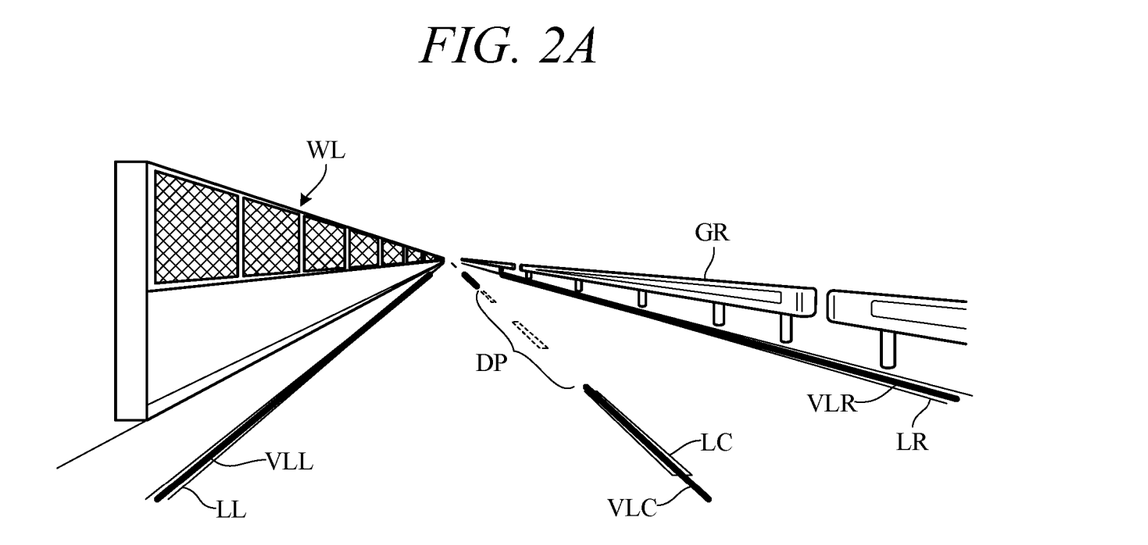
FIG. 2A is a diagram illustrating an example of captured images acquired by a camera installed in front of a subject vehicle.
Figure 2B:
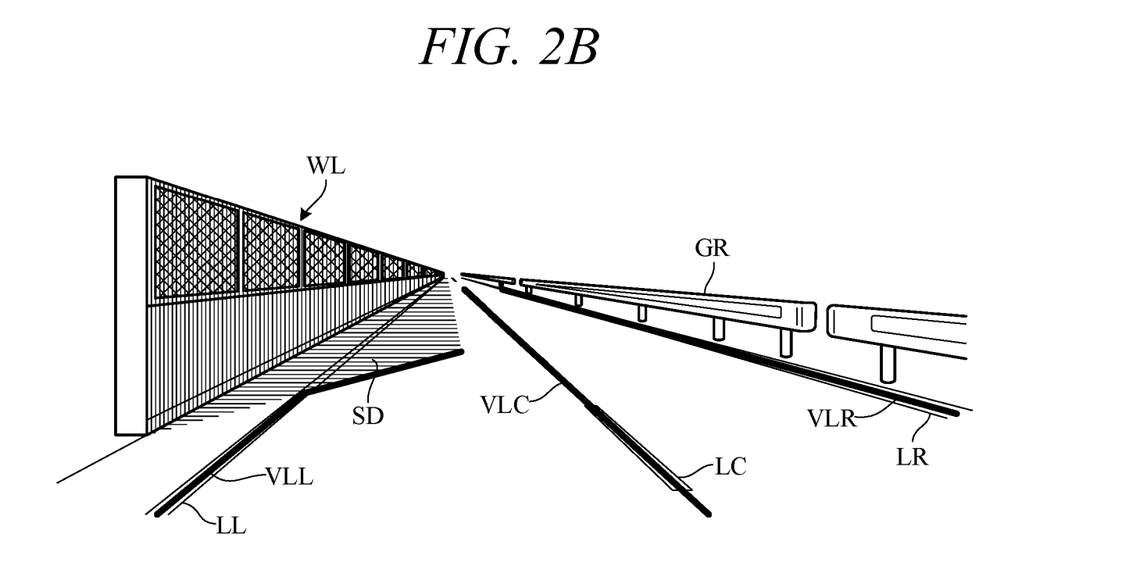
FIG. 2B is a diagram illustrating another example of captured images acquired by the camera.

In the case of recognizing the division lines on the basis of a captured image, the division lines may not be recognized due to backlight or the like, or the shape of the recognized division lines may suddenly change because a repair mark on the road or the end portion (edge) of a shadow of a roadside building is erroneously recognized as a division line. FIGS. 2A and 2B are diagrams illustrating examples of captured images acquired by a camera installed in front of the subject vehicle traveling on a left lane of a road having two lanes on each side. FIGS. 2A and 2B illustrate the recognition results of the division lines (hereinafter, referred to as virtual division lines) that are schematically superimposed and displayed on the captured image. Thick lines VLL, VLC, and VLR in the drawings represent virtual division lines corresponding to division lines LL, LC, and LR that are provided on the road to define the corresponding lanes. Referring to FIG. 2A, a part of the virtual division line VLC is lost due to back light. A region DP represents a region where the virtual division line is lost. Referring to FIG. 2B, the end portion (edge) of a shadow SD of a roadside wall WL is erroneously recognized as the division line LL, and the shape of the virtual division line VLL is deformed from the middle. If the self-driving is continued according to the division line (virtual division line) erroneously recognized as described above, there is a risk that the traveling position of the subject vehicle shifts from the center of the lane, the subject vehicle departs from the road, or the subject vehicle approaches or comes into contact with a three-dimensional object on the road shoulder. Therefore, in order to cope with such a problem, in the present embodiment, the vehicle control device is configured as follows.

Figure 3:
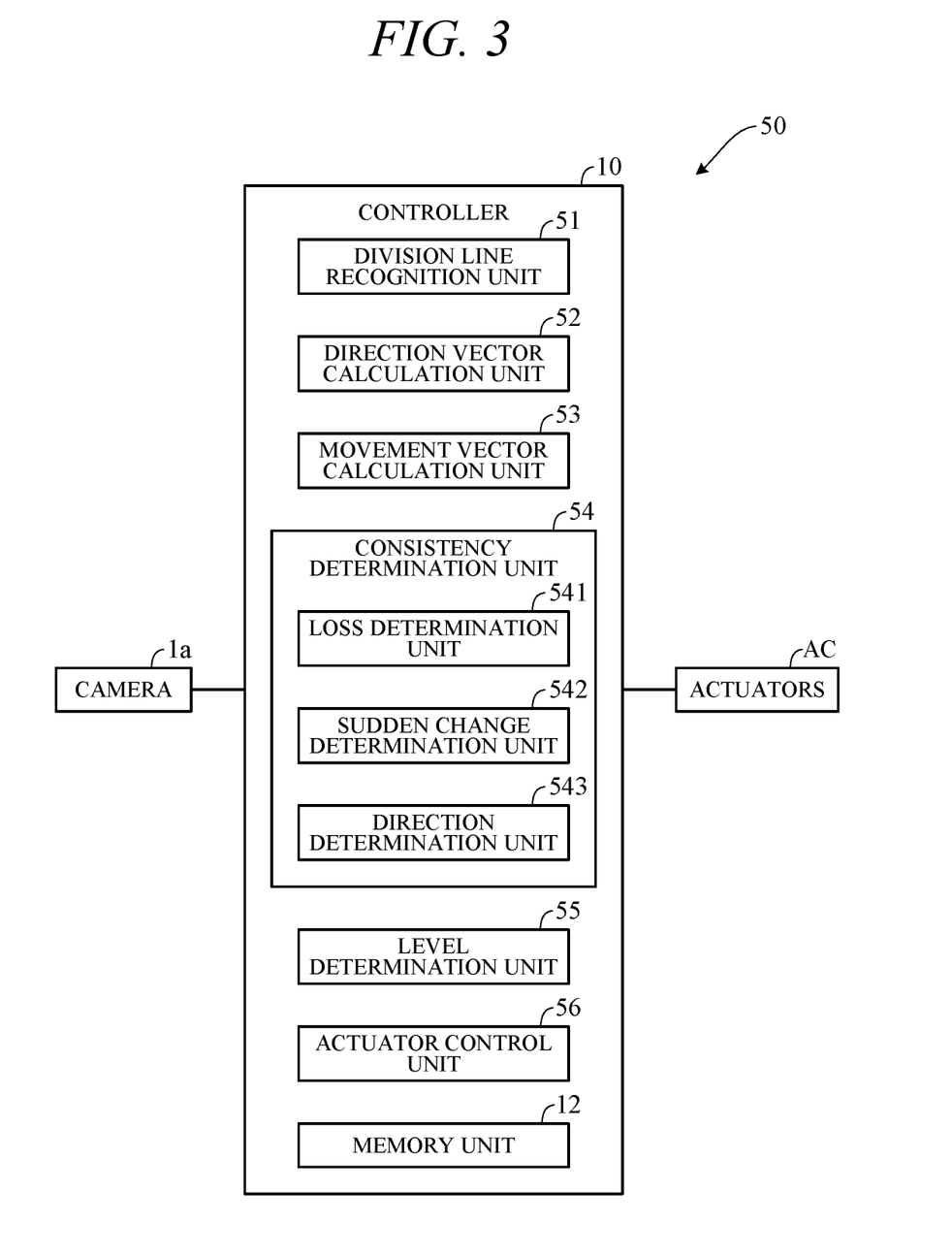
FIG. 3 is a block diagram schematically illustrating main components of a vehicle control device according to the embodiment of the present invention.

FIG. 3 is a block diagram schematically illustrating main components of a vehicle control device 50 according to the embodiment of the present invention, and illustrates a configuration in the case where a subject vehicle 101 mainly travels in the self-drive mode in the lane-keeping manner (in the case where the lane-keeping capability is enabled). As illustrated in FIG. 3, the vehicle control device 50 includes a controller 10, a camera 1a communicably connected to the controller 10, and an actuators AC.

The camera 1a includes an imaging element (image sensor) such as a CCD or a CMOS. The camera 1a captures an image of a predetermined area around the subject vehicle. The camera 1a is attached to a predetermined position (front part) of the subject vehicle, and continuously captures an image of a space in front of the subject vehicle to acquire image data (hereinafter, referred to as captured image data or simply captured image). The camera 1a may be a monocular camera or a stereo camera. The camera 1a constitutes a part of the external sensor group 1.

The vehicle control device 50 illustrated in FIG. 3 includes a division line recognition unit 51, a direction vector calculation unit 52, a movement vector calculation unit 53, a consistency determination unit 54, a level determination unit 55, an actuator control unit 56, and a memory unit 12.

The division line recognition unit 51 recognizes a pair of right and left division lines that define the current lane on which the subject vehicle is traveling based on a detection value (captured image) from the camera 1a, and acquires recognition results (a pair of right and left virtual division lines).

The direction vector calculation unit 52 calculates direction vectors of the pair of right and left virtual division lines acquired by division line recognition unit 51. More specifically, the direction vector calculation unit 52 calculates the direction vectors of the pair of right and left virtual division lines, and calculates an average vector thereof.

The movement vector calculation unit 53 calculates a movement direction (movement vector) of another vehicle (forward vehicle) traveling ahead of the subject vehicle on the basis of the image captured by the camera 1a. When a plurality of forward vehicles is recognized on the basis of the image captured by the camera 1a, the movement vector calculation unit 53 calculates movement vectors of the plurality of forward vehicles and calculates an average vector thereof.

The consistency determination unit 54 determines whether the pair of right and left virtual division lines acquired by the division line recognition unit 51 is consistent with actual division lines on the road. The consistency determination unit 54 has a loss determination unit 541, a sudden change determination unit 542, and a direction determination unit 543.

Figure 4:
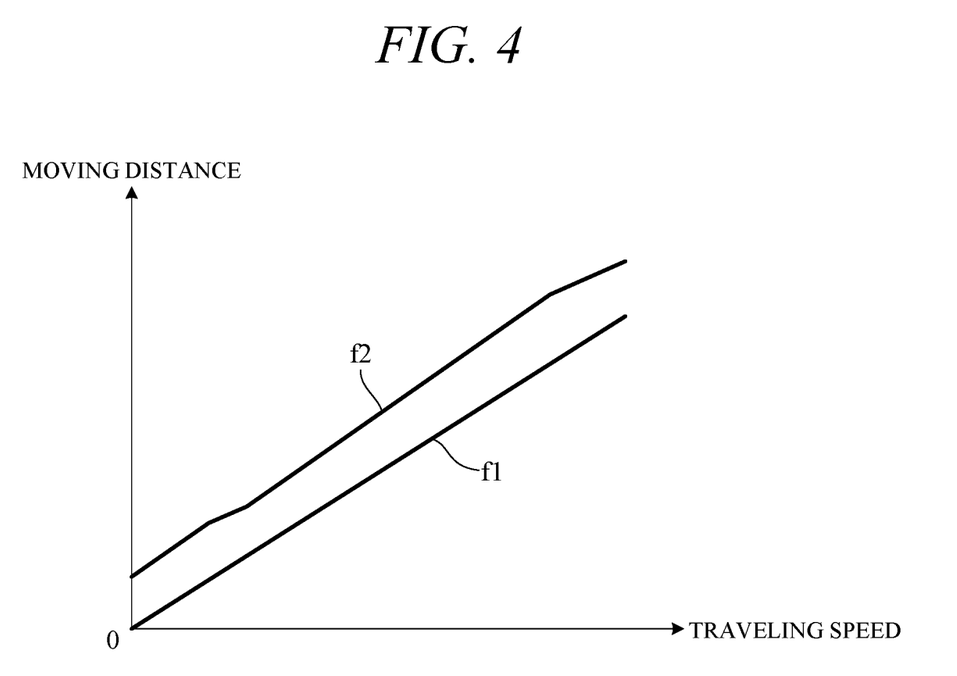
FIG. 4 is a diagram for describing an observation distance threshold.

The loss determination unit 541 executes a loss determination process of determining whether any of the virtual division lines acquired by the division line recognition unit 51 is lost in the middle. Specifically, the loss determination unit 541 determines whether the pair of right and left division lines is recognized by the division line recognition unit 51 up to a point a predetermined distance away forward in the traveling direction from the subject vehicle, that is, whether the length of the pair of right and left virtual division lines is a predetermined length (hereinafter, referred to as observation distance threshold) or more. FIG. 4 is a diagram for describing an observation distance threshold. Characteristic f1 in FIG. 4 indicates the relationship between the traveling speed of the vehicle and the moving distance by which the vehicle traveled at the traveling speed for the maximum allowable time. The maximum allowable time is the maximum time allowed from the detection of erroneous recognition of the virtual division lines due to the lost, sudden change, or the like of the virtual division line to the lowering of the self-driving level. Characteristic f2 indicates the relationship between the traveling speed of the vehicle and the observation distance threshold. As illustrated in FIG. 4, the observation distance threshold corresponding to the traveling speed is a distance obtained by multiplying the traveling speed by a time obtained by adding a margin to the maximum allowable time. The loss determination unit 541 acquires a detection value (traveling speed) from the vehicle speed sensor of the internal sensor group 2, and acquires an observation distance threshold corresponding to the traveling speed based on the characteristic f2 illustrated in FIG. 4.

If the length of the pair of right and left virtual division lines is less than the observation distance threshold, the loss determination unit 541 outputs a determination result indicating NG (inconsistency). The NG (inconsistency) indicates that the virtual division lines and the actual division lines on the road are not consistent with each other. If the length of the pair of right and left virtual division lines is equal to or greater than the observation distance threshold, the loss determination unit 541 outputs a determination result indicating OK (consistency). The OK (consistency) indicates that the virtual division lines and the actual division lines on the road are consistent with each other.

The sudden change determination unit 542 executes a sudden change determination process of determining whether the shape of the pair of right and left virtual division lines has changed suddenly. Specifically, the sudden change determination unit 542 determines whether the degree of change in the shape of the pair of right and left virtual division lines is equal to or greater than a predetermined degree. If the degree of change in the shape of at least one of the pair of right and left virtual division lines is greater than or equal to a predetermined degree, the sudden change determination unit 542 outputs a determination result indicating NG (inconsistency). If the degree of change in the shape of the pair of right and left virtual division lines is less than a predetermined degree, the sudden change determination unit 542 outputs a determination result indicating OK (consistency).

The direction determination unit 543 executes a direction determination process of determining consistency in the extending direction of the virtual division lines. Specifically, the direction determination unit 543 calculates an angle formed by the direction vector calculated by the direction vector calculation unit 52 and the movement vector calculated by the movement vector calculation unit 53 (hereinafter, referred to as inter-vector angle), and determines whether the inter-vector angle is within a predetermined angle. If the inter-vector angle is larger than the predetermined angle, the direction determination unit 543 outputs a determination result indicating NG (inconsistency). If the inter-vector angle is within the predetermined angle, the direction determination unit 543 outputs a determination result indicating OK (consistency).

The level determination unit 55 determines a self-driving capability or a driving support capability to be applied to the subject vehicle. Specifically, the level determination unit 55 determines the self-driving level to be applied to the subject vehicle or the driving tasks to be reduced. Examples of the driving tasks include a steering wheel operation, gripping or non-gripping of a steering wheel, a pedal operation, a peripheral monitoring duty, and the like by an occupant. If the determination results indicating OK (consistency) are output from all of the loss determination unit 541, the sudden change determination unit 542, and the direction determination unit 543, the level determination unit 55 determines that the lane-keeping capability can be continued and maintains the current level of the self-drive mode. On the other hand, if a determination result indicating NG (inconsistency) is output from any of the loss determination unit 541, the sudden change determination unit 542, and the direction determination unit 543, the level determination unit 55 determines that there has occurred erroneous recognition of the division lines. In this case, the level determination unit 55 determines that the lane-keeping travel of the subject vehicle with the lane-keeping capability cannot be continued, and sets the current level of the self-drive mode applied to the subject vehicle to a lower level, or returns the reduced driving tasks to the original ones (increase the driving tasks from the reduced current state). As an example, the level determination unit 55 outputs image information or audio information prompting the occupant to operate the steering wheel (hands-on) to the input/output device 3 (a display, a speaker, or the like) to make a hands-on request. Thereafter, the level determination unit 55 disables the lane-keeping capability.

The actuator control unit 56 controls the actuators AC so that the subject vehicle travels according to the self-driving capability or the driving-support capability determined by the level determination unit 55.

Figure 5:
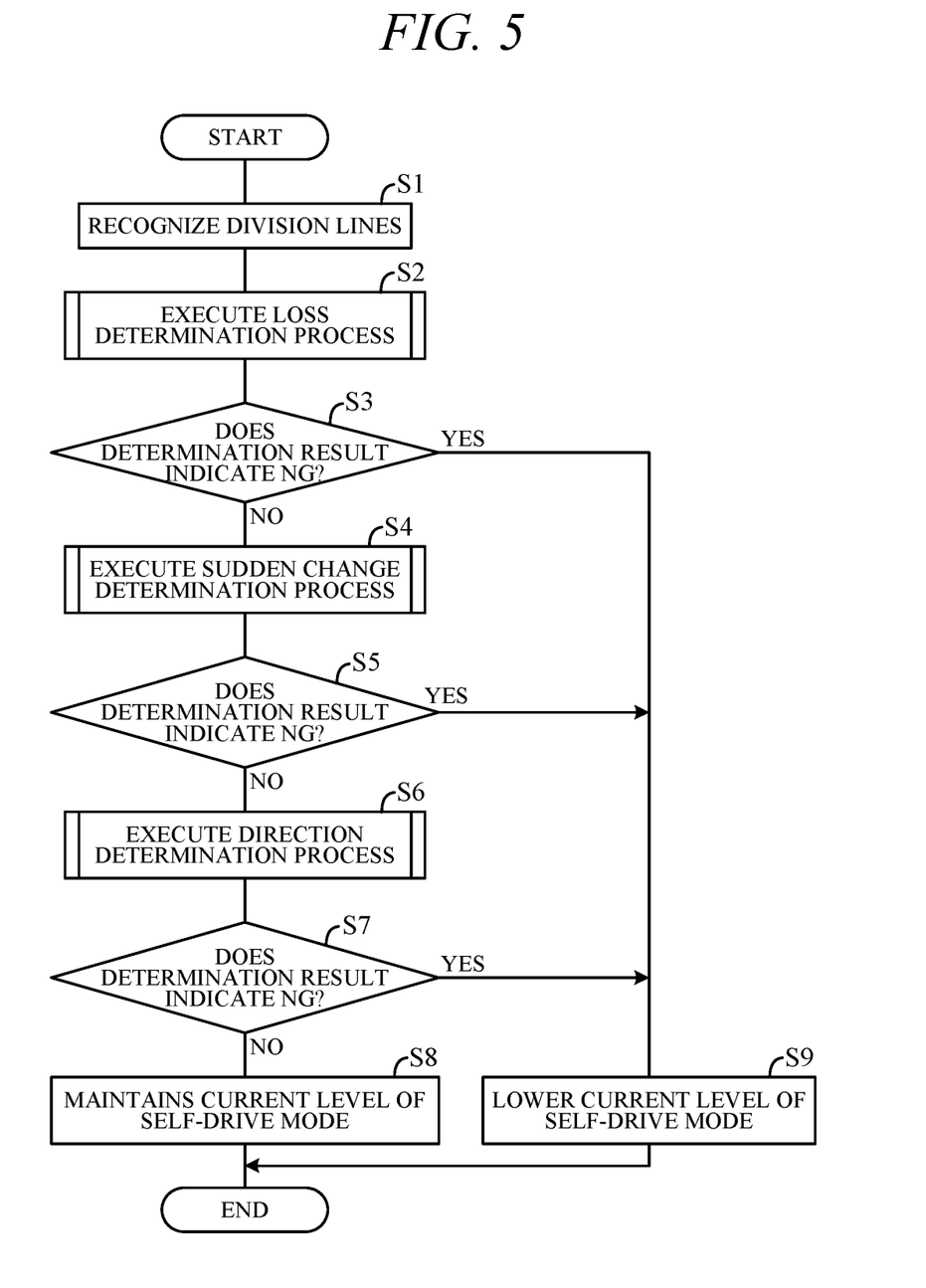
FIG. 5 is a flowchart illustrating an example of processing executed by the controller of FIG. 3.

FIG. 5 is a flowchart illustrating an example of processing executed by the controller 10 of FIG. 3 according to a predetermined program. The processing described in this flowchart is started when the lane-keeping capability of the subject vehicle is enabled, for example, and is repeated in predetermined cycles.

First, in step S1, the controller 10 recognizes the division lines that define the current lane on the basis of the image captured by the camera 1*a*, and acquires recognition results (virtual division lines). At this time, when recognizing three or more virtual division lines (for example, the virtual division lines VLL, VLC, VLR in FIG. 2A), the controller 10 acquires the virtual division lines closest to the subject vehicle (for example, the virtual division lines VLL and VLC in FIG. 2A) from the right side and left side of the subject vehicle. In step S2, the controller 10 executes a loss determination process to determine whether the pair of right and left virtual division lines acquired in step S1 is lost in the middle. In step S3, the controller 10 determines whether the determination result of the loss determination process in step S2 indicates NG (inconsistency). If the determination result is affirmative in step S3, the process proceeds to step S9. If the determination result is negative in step S3, the controller 10 performs a sudden change determination process to determine whether the shape of the virtual division lines acquired in step S1 is not deformed in the middle in step S4. In step S5, the controller determines whether the determination result of the sudden change determination process in step S4 indicates NG (inconsistency).

If the determination result is affirmative in step S5, the process proceeds to step S9. If the determination result is negative in step S5, the controller 10 performs a direction determination process to determine whether the extending direction of the virtual division lines and the moving direction of the surrounding vehicles match in step S6. In step S7, the controller 10 determines whether the determination result of the direction determination process in step S6 indicates NG (inconsistency). If the determination result is negative in step S7, the controller 10 determines in step S8 that the virtual division lines acquired in step S1 and the actual division lines are consistent with each other, that is, there is no erroneous recognition of the division lines, and maintains the current level of the self-drive mode. On the other hand, if the determination result is affirmative in step S7, the controller 10 determines in step S9 that the virtual division lines acquired in step S1 and the actual division lines are not consistent with each other, that is, there is erroneous recognition of the division lines, and sets the current level of the self-drive mode to a lower level, or returns the reduced driving tasks to the original ones.

Figure 6:
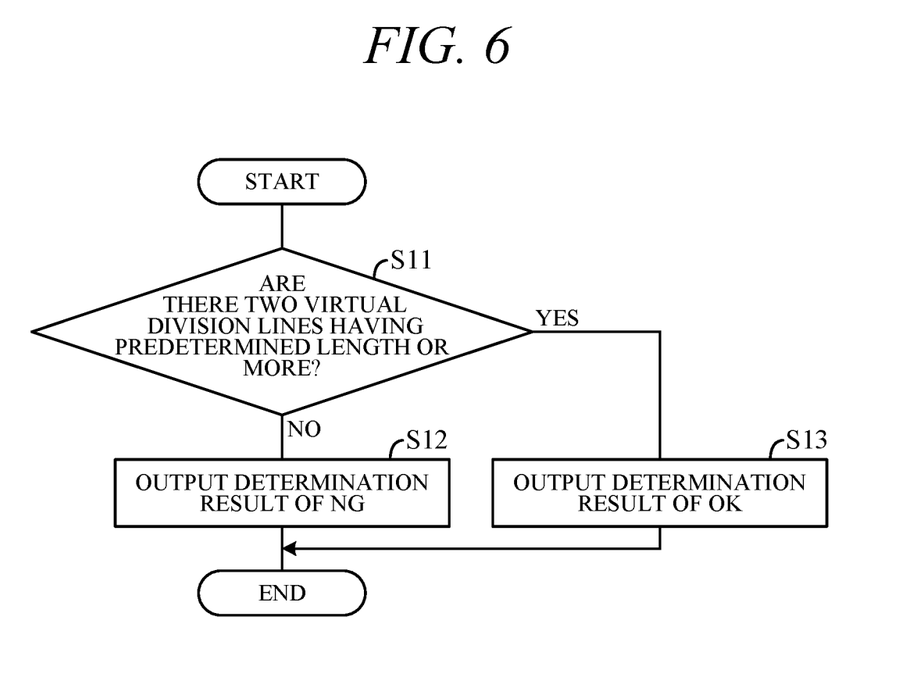
FIG. 6 is a flowchart illustrating an example of loss determination process in FIG. 5.

FIG. 6 is a flowchart illustrating an example of the loss determination process in FIG. 5. First, in step S11, the controller 10 determines whether there are two virtual division lines having a predetermined length (observation distance threshold) or more among the virtual division lines acquired in step S1 of FIG. 5, that is, whether each of the pair of right and left virtual division lines has a length equal to or longer than the observation distance threshold. If the determination result is negative in step S11, the controller 10 outputs a determination result indicating NG (inconsistency) in step S12, and the process is ended. If the determination result is affirmative in step S11, the controller 10 outputs a determination result indicating OK (consistency) in step S13, and the process is ended.

Figure 7:
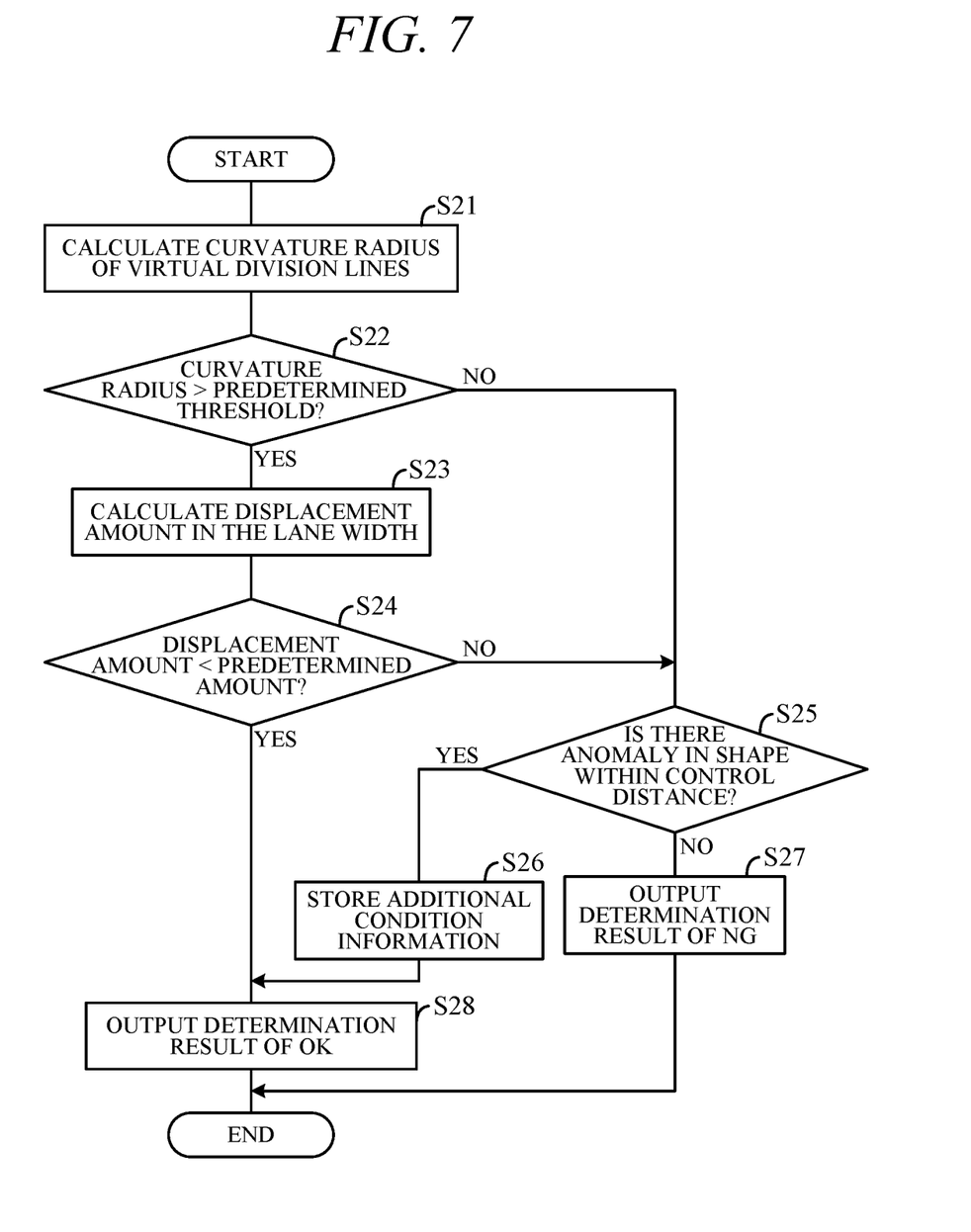
FIG. 7 is a flowchart illustrating an example of sudden change determination process in FIG. 5.

FIG. 7 is a flowchart illustrating an example of the sudden change determination process in FIG. 5. In step S21, the controller 10 calculates the minimum curvature radius of the virtual division lines acquired in step S1 of FIG. 5. Specifically, the controller 10 divides the virtual division lines at regular intervals, calculates the radius of curvature of each partial division line obtained by the division, and acquires the minimum curvature radius among the calculated curvature radiuses. In step S22, the controller 10 determines whether the minimum curvature radius of the virtual division lines is greater than a predetermined threshold. The predetermined threshold is set with a value with which a change in the shape of the virtual division lines based on the shape of the road (curve or the like) is not detected as erroneous recognition of the division lines. If the determination result is negative in step S22, the process proceeds to step S25. If the determination result is affirmative in step S22, in step S23, the controller 10 calculates a displacement amount (offset amount) in the lane width direction of the virtual division lines acquired in step S1 of FIG. 5. The displacement amount may be calculated based on the distance in the lane width direction between the partial division line located on the leftmost side and the partial division line located on the rightmost side among the partial division lines included in the virtual division lines, or may be calculated based on the virtual division lines acquired at the previous time of execution of step S1. In step S24, the controller 10 determines whether the displacement amount calculated in step S23 is less than a predetermined amount. The predetermined amount is set to a value with which displacement of the virtual division lines in the lane width direction based on wobbling of the subject vehicle in the lane is not detected as erroneous recognition of the division lines. For example, the predetermined amount is set to a half of a value (length) obtained by subtracting the vehicle width from the lane width. The lane width may be a preset value, or the lane width of the road on which the subject vehicle is traveling may be acquired from the map information stored in the memory unit 12. If the determination result is negative in step S24, the controller 10 determines in step S25 whether the degree of change in the shape of the virtual division lines is a predetermined degree or more within the control distance (<observation distance threshold) of the lane-keeping capability, that is, whether an anomaly has occurred in the shape of the virtual division lines. Specifically, the controller 10 determines whether any of the virtual division lines is not broken halfway as illustrated in FIG. 2B, whether any of the virtual division lines is not partially shifted (offset), or the like. The control distance of the lane-keeping capability is a distance obtained by multiplying the traveling speed of the subject vehicle by the control range (time) of the lane-keeping capability. If the determination result is affirmative in step S25, that is, if there is no anomaly in the shape of the virtual division lines, the controller 10 stores information indicating conditional OK (consistency) (hereinafter, referred to as additional condition information) in the memory unit 12 in step S26, and the process proceeds to step S28. Conditional OK (consistency) indicates that the virtual division lines and the actual division lines are consistent with each other under a predetermined condition. In step S26, the controller stores, as additional condition information in the memory unit 12, information indicating that only portions within the control distance from the subject vehicle of the virtual division lines acquired in step S1 of FIG. 5 are consistent with the actual division lines on the road. If the determination result is negative in step S25 due to an anomaly in the shape of the virtual division lines, the controller 10 outputs a determination result indicating NG (inconsistency) in step S27. On the other hand, if the determination result is affirmative in step S24, the controller 10 outputs a determination result indicating OK (consistency) in step S28, and the process is ended.

Figure 8:
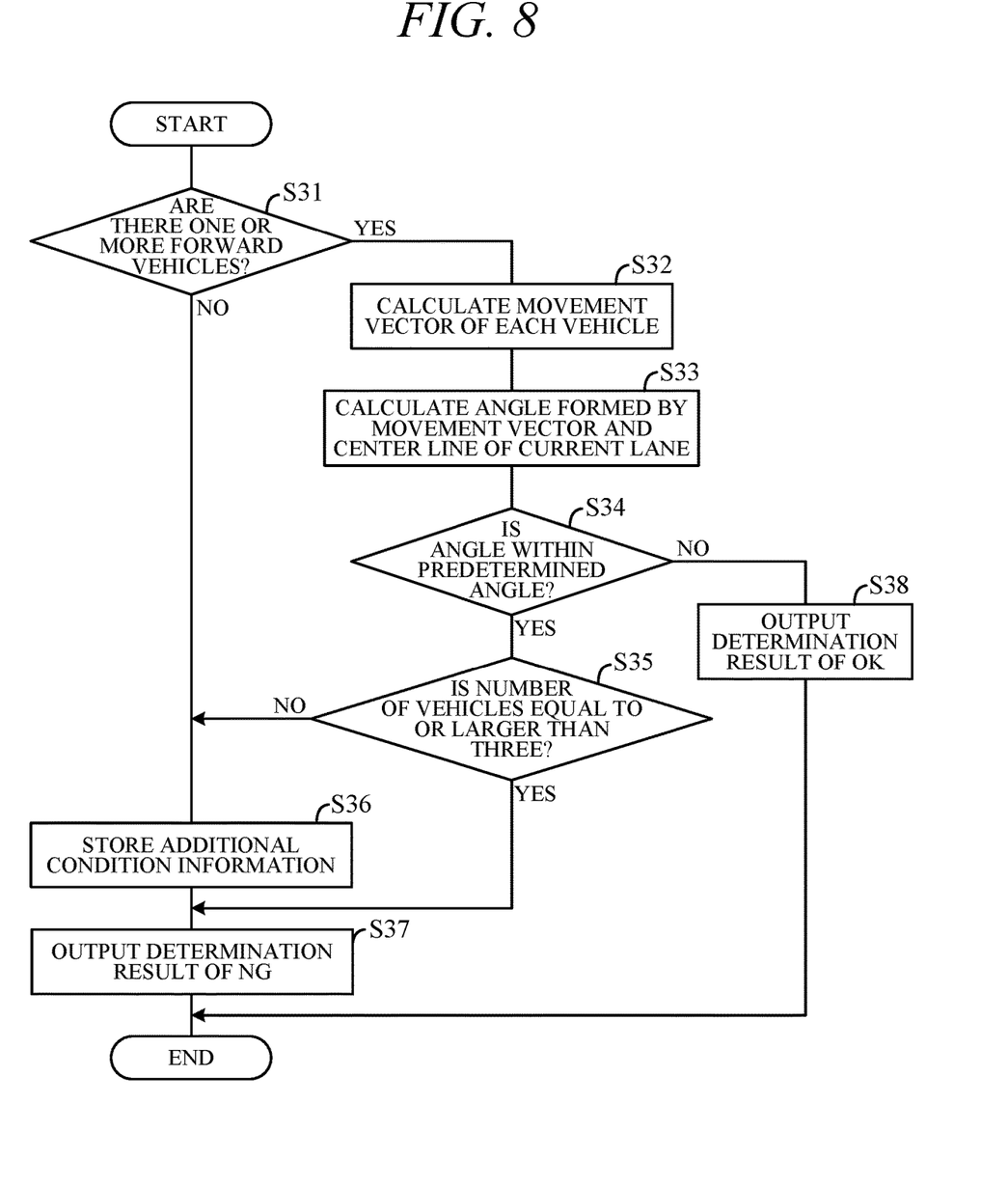
FIG. 8 is a flowchart illustrating an example of direction determination process in FIG. 5.

FIG. 8 is a flowchart illustrating an example of the direction determination process in FIG. 5. In step S31, based on the image captured by the camera 1*a*, the controller 10 recognizes a forward vehicle(s) traveling in the adjacent lane in the same traveling direction as the subject vehicle, and determines whether the number of recognized forward vehicle(s) is one or more. The forward vehicle may include another vehicle traveling in the current lane. If the determination result is negative in step S31, that is, the number of recognized forward vehicle is 0, the process proceeds to step S36. If the determination result is affirmative in step S31, the controller 10 calculates the movement vector of each forward vehicle in step S32. Specifically, the controller 10 recognizes the position of each forward vehicle at regular time intervals on the basis of the image captured by the camera 1*a*, linearly approximates the change in the position coordinates of each forward vehicle to calculate the movement vector of each forward vehicle, and calculates the average vector thereof. In step S33, the controller 10 calculates an angle (inter-vector angle) formed by (the inclination of) the movement vector calculated in step S32 and (the inclination of) the center line of the current lane. The (inclination of the) center line of the current lane is acquired by calculating the average vector of the direction vectors of the pair of right and left virtual division lines acquired in step S1 of FIG. 5. In step S34, the controller 10 determines whether the inter-vector angle calculated in step S33 is within a predetermined angle.

If the determination result is affirmative in step S34, the controller 10 determines in step S35 whether the number of forward vehicle(s) recognized in step S31 is equal to or larger than a predetermined number, more specifically, whether the number is equal to or larger than three. The predetermined number may be set to another number, for example, four or five, according to the required recognition accuracy of the division lines. If the determination result is negative in step S35, the controller 10 stores additional condition information indicating conditional OK (consistency) in the memory unit 12 in step S36, and the process proceeds to step S37. In step S36 that is executed if the determination result is negative in step S31, the controller 10 stores information indicating that the direction determination process has not been performed due to the absence of forward vehicle in the memory unit 12 as additional condition information. In step S36 that is executed if the determination result is negative in step S35, the controller 10 stores information indicating that the number of forward vehicles of which the movement vectors are to be calculated is small in the memory unit 12 as additional condition information. If the determination result is affirmative in step S35, the controller 10 outputs a determination result indicating OK (consistency) in step S37. If the determination result is negative in step S34, that is, if the inter-vector angle is larger than the predetermined angle, the controller 10 outputs a determination result indicating NG (inconsistency) in step S38. The predetermined angle is set to a value that is not erroneously determined as NG (inconsistency) due to the inclination of the movement vector based on wobbling of the forward vehicle in the lane width direction or the inclination of the movement vector based on the lane change of the forward vehicle.

In step S8 of FIG. 5, the controller 10 may determine whether the additional condition information is stored in the memory unit 12. If the additional condition information is stored, the controller 10 may continue to enable the lane-keeping capability based on the additional condition information. Specifically, if the additional condition information indicating that only portions within the control distance of the virtual division lines are consistent with the actual division lines on the road or the additional condition information indicating that the direction determination process has not been performed is stored in the memory unit 12, the controller 10 may continue to enable the lane-keeping capability after outputting attention-seeking information (image information or audio information) to the input/output device 3 (a display, a speaker, or the like).

According to the present embodiment, the following operations and advantageous effects can be achieved.

(1) The vehicle control device 50 controls the subject vehicle with a self-driving capability or a driving support capability that travels along a lane. The vehicle control device 50 includes: the camera 1*a* that detects (images) an external situation in a predetermined area around the traveling subject vehicle; the division line recognition unit 51 that recognizes a pair of right and left division lines that define the current lane in which the subject vehicle is traveling based on the detection value (captured image data) from the camera 1*a*; the direction vector calculation unit 52 that calculates the direction vector of the pair of right and left division lines recognized by the division line recognition unit 51; the movement vector calculation unit 53 that calculates the movement vector of a vehicle ahead of the subject vehicle based on the captured image data from the camera 1*a*; and the level determination unit 55 that determines the self-driving capability or the driving support capability to be applied to the subject vehicle based on the result of comparison between the direction vector calculated by the direction vector calculation unit 52 and the movement vector calculated by the movement vector calculation unit 53. The determination of the self-driving capability or the driving support capability to be applied to the subject vehicle by the level determination unit 55 includes setting the current level of the self-drive mode to a lower level or determining driving tasks to be reduced. The vehicle control device 50 further includes the consistency determination unit 54 that calculates the angle between the direction vector calculated by the direction vector calculation unit 52 and the movement vector calculated by the movement vector calculation unit 53 and determines whether the calculated angle is larger than a predetermined angle. If the consistency determination unit 54 (direction determination unit 543) determines that the angle between the direction vector and the movement vector is larger than the predetermined angle, the level determination unit 55 sets the current level of the self-drive mode applied to the subject vehicle to a lower level, or returns the reduced driving tasks to the original ones. As described above, since the self-driving capability or the driving support capability to be applied to the subject vehicle is determined based on the direction vector of the division lines and the movement vector of the other vehicle, it is possible to provide quick driving support (traveling support). As a result, even if the division lines are erroneously recognized, the traveling state of the subject vehicle can be quickly controlled to the safe side. In addition, the safety of traveling in the self-drive mode can be improved.

(2) The direction vector calculation unit 52 calculates the average vector of the direction vectors of the pair of right and left division lines. If a plurality of forward vehicles is recognized on the basis of the captured image data from the camera 1a, the movement vector calculation unit 53 calculates the average vector of the movement vectors of the plurality of forward vehicles. The consistency determination unit 54 (direction determination unit 543) calculates the angle between the average vector of the direction vectors calculated by the direction vector calculation unit 52 and the average vector of the movement vectors calculated by the movement vector calculation unit 53. If the consistency determination unit 54 (direction determination unit 543) determines that the angle between the average vector of the direction vectors and the average vector of the movement vectors is larger than the predetermined angle, the level determination unit 55 sets the current level of the self-drive mode applied to the subject vehicle to a lower level, or returns the reduced driving tasks to the original ones. In this manner, determining the self-driving capability or the driving support capability to be applied to the subject vehicle based on the movement vectors of the plurality of other vehicles makes it possible to accurately detect the erroneous recognition of the division lines and further improve the safety of traveling in the self-drive mode.

(3) The consistency determination unit 54 (loss determination unit 541) determines whether the pair of right and left division lines are recognized by the division line recognition unit 51 up to a point away forward from the subject vehicle by a predetermined distance in the traveling direction. If the consistency determination unit 54 (loss determination unit 541) determines that the pair of right and left division lines have not been recognized up to a point away from the subject vehicle by a predetermined distance, the level determination unit 55 sets the current level of the self-drive mode applied to the subject vehicle to a lower level, or returns the reduced driving tasks to the original ones. As a result, if the loss of the division line is detected, the traveling state of the subject vehicle can be quickly controlled to the safe side.

(4) If determining that the pair of right and left division lines have been recognized up to a point away from the subject vehicle by a predetermined distance, the consistency determination unit 54 (sudden change determination unit 542) determines whether the degree of change in the shape of the pair of right and left division lines is a predetermined degree or more. If the consistency determination unit 54 (sudden change determination unit 542) determines that the degree of change in the shape of the pair of right and left division lines is a predetermined degree or more, the level determination unit 55 sets the current level of the self-drive mode applied to the subject vehicle to a lower level or returns the reduced driving tasks to the original ones. The determination unit (54) calculates the minimum curvature radius of each of the pair of right and left division lines. If the minimum curvature radius of at least one of the pair of right and left division lines is larger than a predetermined threshold, the determination unit (54) determines that the degree of change in the shape of the pair of right and left division lines is a predetermined degree or more. As a result, if the sudden change of the division lines is detected, the traveling state of the subject vehicle can be quickly controlled to the safe side.

The above embodiment may be modified in various forms. Some modifications will be described below. In the above embodiment, the camera 1a as the exterior environment detection unit detects the external situation around the subject vehicle. However, the external situation may be detected using a LiDAR or the like, and the configuration of the exterior environment detection unit is not limited to that described above. In this case, the movement vector calculation unit may calculate the movement vector of the forward vehicle based on the detection value from the LiDAR or the like.

In the above embodiment, the division line recognition unit 51 as the recognition unit is included in the controller 10 as an example. However, the configuration of the recognition unit is not limited to that described above. For example, if the camera 1a includes a computer that has a processing unit such as a CPU (microprocessor), a memory unit such as a ROM and a RAM, and other peripheral circuits (not illustrated) such as an I/O interface, the camera 1a may have a recognition unit as a functional component. In this case, the recognition unit outputs information indicating the recognition result of the division lines (hereinafter, referred to as division line information) to the controller 10. The direction vector calculation unit 52 or the like of the controller 10 performs various processes based on the division line information input to the controller 10.

In the above embodiment, in the loss determination process of FIG. 6, if the number of virtual division lines acquired in step S1 of FIG. 5 whose length are equal to or more than a predetermined length (observation distance threshold) is not two, the determination result indicating NG (inconsistency) is output. However, in the case where the subject vehicle is configured to be able to travel in the lane-keeping manner according to any one of the right and left virtual division lines, if the number of virtual division line having a predetermined length or more acquired in step S1 of FIG. 5 is one, additional condition information indicating conditional OK (consistency) may be stored in the memory unit 12 instead of outputting the determination result indicating NG (inconsistency). More specifically, additional condition information indicating that only one virtual division line can be acquired may be stored in the memory unit 12. Then, in step S8 of FIG. 5, when the additional condition information indicating that only one virtual division line can be acquired is stored in the memory unit 12, the lane-keeping capability may be continued after the attention-seeking information (image information or audio information) is output to the input/output device 3 (display, speaker, or the like). In the above embodiment, in the direction determination process of FIG. 8, the inter-vector angle is calculated based on the average vector of the direction vectors of the pair of right and left virtual division lines acquired in step S1 of FIG. 5. However, if one of the pair of right and left virtual division lines acquired in step S1 of FIG. 5 has a lost portion or a suddenly changing portion, the determination unit may calculate the inter-vector angle based on the direction vector of the other virtual division line. Furthermore, if the calculated inter-vector angle is within the predetermined angle, additional condition information indicating conditional OK (consistency) may be stored in the memory unit 12. More specifically, additional condition information indicating that the inter-vector angle has been calculated on the basis of the direction vector of one virtual division line may be stored in the memory unit 12. In the above embodiment, if the number of forward vehicles recognized in step S31 is three or more in step S35 of FIG. 8, the determination result indicating OK (consistency) is output in step S37. However, if there is a forward vehicle having a movement vector whose angle formed with the movement vector of another forward vehicle exceeds a predetermined angle among the plurality of forward vehicles recognized in step S31, the determination unit may exclude the forward vehicle from the calculation target of the average vector in step S32. In this case, in step S35, instead of determining whether the number of forward vehicles recognized in step S31 is three or more, it may be determined whether the number of forward vehicles of which an average vector is determined to be calculated in step S32 is three or more.

Furthermore, in the above embodiment, the case where, when the lane-keeping capability is enabled, the consistency determination unit 54 executes the above-described determination processes (loss determination process, sudden change determination process, and direction determination process) has been described as an example (FIG. 5). However, the determination unit may also execute the above-described determination processes when another self-driving capability for controlling the driving actuator based on the virtual division lines, for example, a road-departure-mitigation capability is enabled.

The above embodiment can be combined as desired with one or more of the above modifications. The modifications can also be combined with one another.

According to the present invention, quick traveling support can be provided.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus for controlling a subject vehicle having a self-driving capability or a driving support capability and traveling along a lane, the vehicle control apparatus comprising:
   at least one sensor configured to detect an external situation in a predetermined area around the subject vehicle while the subject vehicle is traveling; and
   a microprocessor and a memory coupled to the microprocessor, wherein
   the microprocessor is configured to perform:
   recognizing a pair of right and left division lines that define the lane in which the subject vehicle is traveling based on a detection value from the at least one sensor;
   calculating a direction vector of the pair of right and left division lines;
   calculating a movement vector of a forward vehicle ahead of the subject vehicle based on the detection value from the at least one sensor; and
   determining the self-driving capability or the driving support capability to be applied to the subject vehicle based on the direction vector and the movement vector;
   the microprocessor is configured to further perform:
   determining a consistency of the pair of right and left division lines, wherein
   the determining of the consistency includes calculating an angle between the direction vector and the movement vector to determine whether the angle is larger than a predetermined angle; and
   the determining of the self-driving capability or the driving support capability includes, when it is determined that the angle between the direction vector and the movement vector is larger than the predetermined angle, setting a current level of a self-drive mode applied to the subject vehicle to a lower level, or returning reduced driving tasks to original driving tasks.

2. The vehicle control apparatus according to claim 1, wherein
   the microprocessor is configured to perform:
   the calculating of the direction vector including calculating an average vector of direction vectors of the pair of right and left division lines;
   the calculating of the movement vector including, when a plurality of forward vehicles is recognized based on the detection value from the at least one sensor, calculating an average vector of movement vectors of the plurality of forward vehicles;
   the determining of the consistency including calculating an angle between the average vector of the direction vectors and the average vector of the movement vectors; and
   the determining of the self-driving capability or the driving support capability including, when it is determined that the angle between the average vector of the direction vectors and the average vector of the movement vectors is larger than the predetermined angle, setting the current level of the self-drive mode applied to the subject vehicle to the lower level, or returning the reduced driving tasks to the original driving tasks.

3. The vehicle control apparatus according to claim 1, wherein
   the microprocessor is configured to perform:
   the determining of the consistency including further determining whether the pair of right and left division lines are recognized up to a point away from the subject vehicle by a predetermined distance in the traveling direction, and
   the determining of the self-driving capability or the driving support capability including, when it is determined that the pair of right and left division lines have not been recognized up to the point away from the subject vehicle by the predetermined distance, setting the current level of the self-drive mode applied to the subject vehicle to the lower level, or returning the reduced driving tasks to the original driving tasks.

4. The vehicle control apparatus according to claim 3, wherein
   the microprocessor is configured to perform:
   the determining of the consistency including further determining whether a degree of change in a shape of the pair of right and left division lines is a predetermined degree or more; and the determining of the self-driving capability or the driving support capability including, when it is determined that the degree of change in the shape of the pair of right and left division lines is the predetermined degree or more, setting the current level of the self-drive mode applied to the subject vehicle to the lower level, or returning the reduced driving tasks to the original driving tasks.

5. The vehicle control apparatus according to claim 4, wherein
the microprocessor is configured to perform:
the determining of the consistency including calculating a minimum curvature radius of each of the pair of right and left division lines and when the minimum curvature radius of at least one of the pair of right and left division lines is larger than a predetermined threshold, determining that the degree of change in the shape of the pair of right and left division lines is the predetermined degree or more.

6. A vehicle control apparatus for controlling a subject vehicle having a self-driving capability or a driving support capability and traveling along a lane, the vehicle control apparatus comprising:
at least one sensor configured to detect an external situation in a predetermined area around the subject vehicle while the subject vehicle is traveling; and
a microprocessor and a memory coupled to the microprocessor, wherein
the microprocessor is configured to function as:
a division line recognition unit configured to recognize a pair of right and left division lines that define the lane in which the subject vehicle is traveling based on a detection value from the at least one sensor;
a direction vector calculation unit configured to calculate a direction vector of the pair of right and left division lines recognized by the division line recognition unit;
a movement vector calculation unit configured to calculate a movement vector of a forward vehicle ahead of the subject vehicle based on the detection value from the at least one sensor; and
a level determination unit configured to determine the self-driving capability or the driving support capability to be applied to the subject vehicle based on the direction vector calculated by the direction vector calculation unit and the movement vector calculated by the movement vector calculation unit, wherein
the microprocessor is configured to further function as:
a consistency determination unit configured to calculate an angle between the direction vector and the movement vector to determine whether the angle is larger than a predetermined angle, wherein
when it is determined by the consistency determination unit that the angle between the direction vector and the movement vector is larger than the predetermined angle, the level determination unit is configured to set a current level of a self-drive mode applied to the subject vehicle to a lower level, or return reduced driving tasks to original driving tasks.

7. The vehicle control apparatus according to claim 6, wherein
the direction vector calculation unit is configured to calculate an average vector of direction vectors of the pair of right and left division lines,
when a plurality of forward vehicles is recognized based on the detection value from the at least one sensor, the movement vector calculation unit is configured to calculate an average vector of movement vectors of the plurality of forward vehicles,
the consistency determination unit is configured to calculate the angle between the average vector of the direction vectors and the average vector of the movement vectors, and
when it is determined by the consistency determination unit that the angle between the average vector of the direction vectors and the average vector of the movement vectors is larger than the predetermined angle, the level determination unit is configured to set the current level of the self-drive mode applied to the subject vehicle to the lower level, or return the reduced driving tasks to the original driving tasks.

8. The vehicle control apparatus according to claim 6, wherein
the consistency determination unit is configured to determine whether the pair of right and left division lines are recognized up to a point away from the subject vehicle by a predetermined distance in the traveling direction, and
when it is determined by the consistency determination unit that the pair of right and left division lines have not been recognized up to the point away from the subject vehicle by the predetermined distance, the level determination unit is configured to set the current level of the self-drive mode applied to the subject vehicle to the lower level, or return the reduced driving tasks to the original driving tasks.

9. The vehicle control apparatus according to claim 8, wherein
the consistency determination unit is configured to determine whether a degree of change in a shape of the pair of right and left division lines is a predetermined degree or more, and
when it is determined by the consistency determination unit that the degree of change in the shape of the pair of right and left division lines is the predetermined degree or more, the level determination unit is configured to set the current level of the self-drive mode applied to the subject vehicle to the lower level, or return the reduced driving tasks to the original driving tasks.

10. The vehicle control apparatus according to claim 9, wherein
the consistency determination unit is configured to calculate a minimum curvature radius of each of the pair of right and left division lines and when the minimum curvature radius of at least one of the pair of right and left division lines is larger than a predetermined threshold, is configured to determine that the degree of change in the shape of the pair of right and left division lines is the predetermined degree or more.

11. A method of controlling a subject vehicle having a self-driving capability or a driving support capability and traveling along a lane, the method comprising:
detecting, with at least one sensor, an external situation in a predetermined area around the subject vehicle while the subject vehicle is traveling;
recognizing a pair of right and left division lines that define the lane in which the subject vehicle is traveling based on a detection value from the at least one sensor;
calculating a direction vector of the pair of right and left division lines;
calculating a movement vector of a forward vehicle ahead of the subject vehicle based on the detection value from the at least one sensor; and determining the self-driving capability or the driving support capability to be applied to the subject vehicle based on the direction vector and the movement vector, wherein the method further comprises determining a consistency of the pair of right and left division lines, wherein the determining of the consistency includes calculating an angle between the direction vector and the movement vector to determine whether the angle is larger than a predetermined angle; and the determining of the self-driving capability or the driving support capability includes, when it is determined that the angle between the direction vector and the movement vector is larger than the predetermined angle, setting a current level of a self-drive mode applied to the subject vehicle to a lower level, or returning reduced driving tasks to original driving tasks.

* * * * *